May 5, 1959      D. E. VAN PELT      2,885,091
DISPLAY UNITS AND PARTITION CLIP SUPPORT
Filed March 21, 1955      3 Sheets-Sheet 1
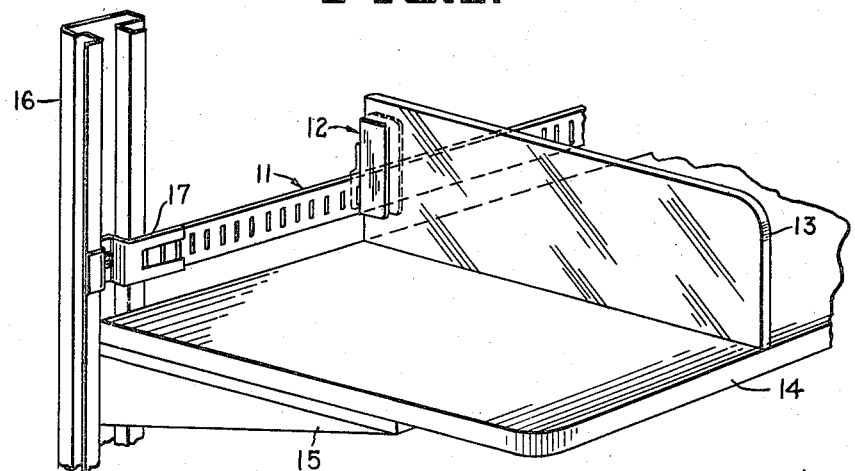
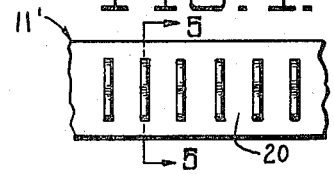
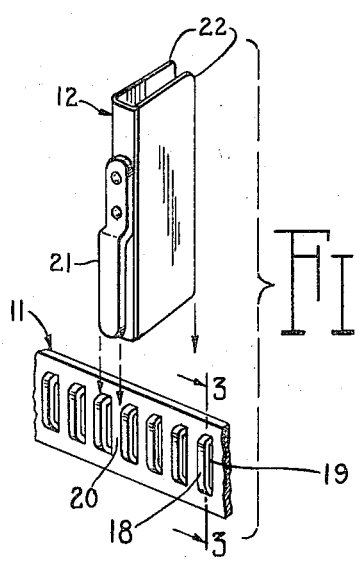
INVENTOR.
DONOVAN E. VAN PELT
BY
ATTORNEYS

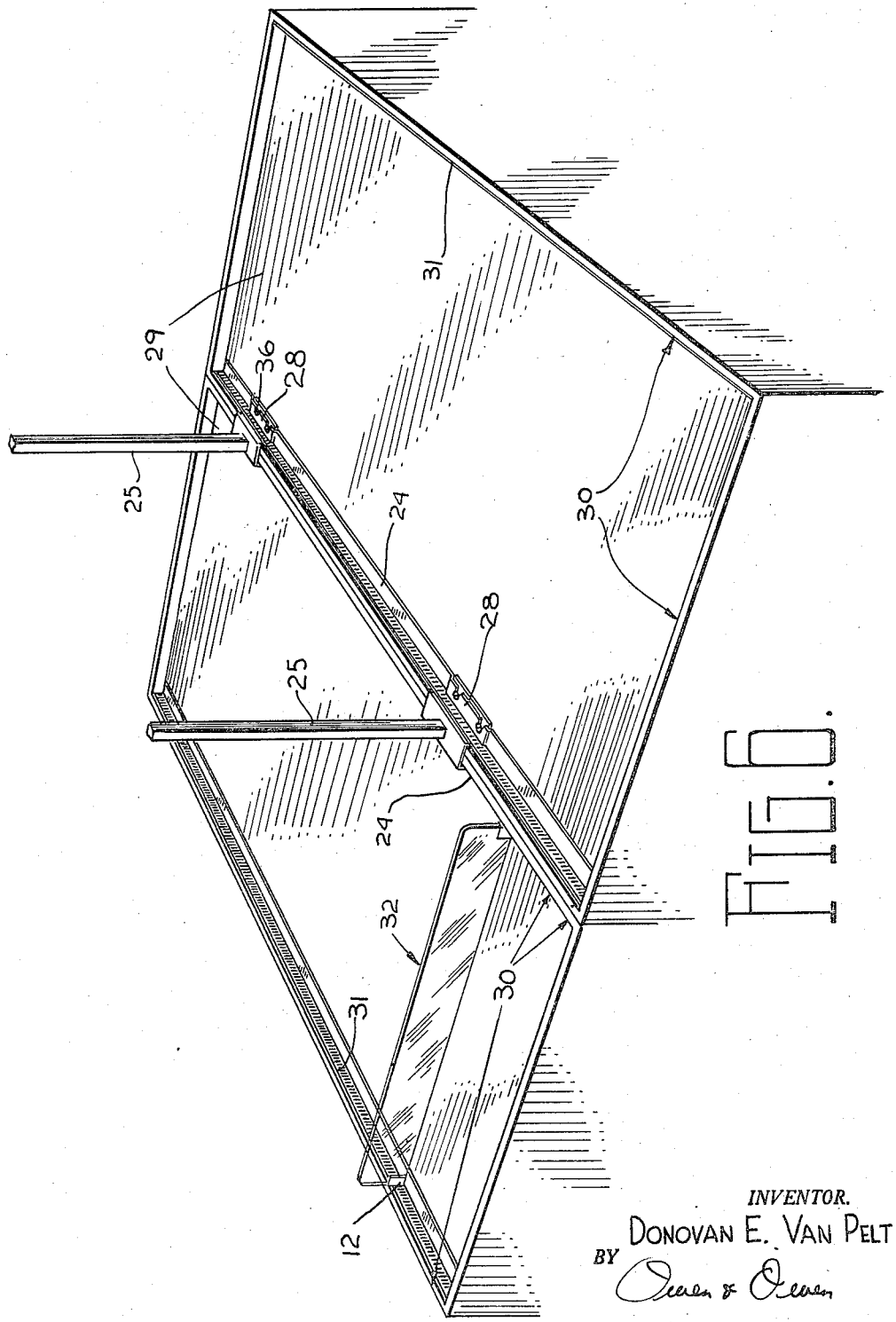

May 5, 1959 D. E. VAN PELT 2,885,091
DISPLAY UNITS AND PARTITION CLIP SUPPORT
Filed March 21, 1955 3 Sheets-Sheet 3

INVENTOR.
DONOVAN E. VAN PELT
BY
ATTORNEYS

United States Patent Office 2,885,091
Patented May 5, 1959

2,885,091

DISPLAY UNITS AND PARTITION CLIP SUPPORT

Donovan E. Van Pelt, Bronson, Mich., assignor to L. A. Darling Company, Bronson, Mich., a corporation of Delaware Application March 21, 1955, Serial No. 495,512

3 Claims. (Cl. 211—184)

This invention relates to an improvement in display units, and to a partition clip support, and, more particularly, to an improved partition clip support and to display units incorporating same.

In the merchandise display field there is frequent occasion for the re-arrangement on counter tops or other display units of partitioning which forms bins of appropriate size for specific merchandise. To accomplish this, various types of clips have been suggested, and are in rather general use, for engaging a partition member, which is frequently of glass, and seat at various points on clip support members.

Partition clip supports for such use must provide a plurality of attachment points so that the support can be used on display units of varying size, and the number of partitions, and the spacing between adjacent pairs, can be varied with the maximum number of possible combinations.

The instant invention is based upon the discovery of a partition clip support which, so far as is known, provides greater flexibility than any previously known support.

It is, therefore, an object of the invention to provide an improved partition clip support.

It is a further object to provide a display unit including an improved partition clip support.

Other objects and advantages will be apparent from the description which follows, reference being had to the accompanying drawings, in which—

Fig. 1 is a view in perspective, showing a partition clip support according to the invention as used in one particular display unit comprising a shelf member mounted in channel supports;

Fig. 2 is an assembly view showing one specific partition clip in position for mounting on a clip support according to the invention;

Fig. 3 is a view in cross-section along the line 3—3 in Fig. 2;

Fig. 4 is a plan view of a modified form of clip support according to the invention;

Fig. 5 is a view in section along the line 5—5 of Fig. 4;

Fig. 6 is a view in perspective showing a modified partition clip support according to the invention as used in another particular display unit comprising adjacent counter members;

Figure 7:
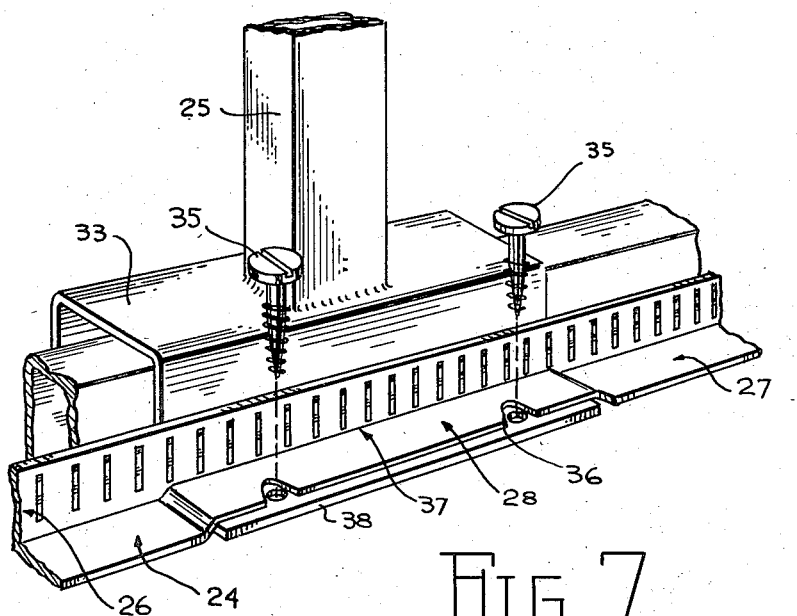
Fig. 7 is an enlarged view of a portion of Fig. 6 showing cooperation between the clip support and an upright mounting.

Referring now in more detail to the drawings, an embodiment of the invention comprises a clip support designated generally by the numeral 11 in Fig. 1, which shows the support 11 in a particular display unit. A partition clip 12 is detachably mounted on the clip support 11, and engages a partition panel 13, which may be of glass, or any other suitable material, and which can be moved longitudinally of a shelf 14 to any desired location. The shelf 14 is supported by brackets 15, which are mounted in channel members 16; the channel members also mount a suitable attaching means 17, which engages the clip support 11.

The clip support 11 is shown in more detail in Fig. 2, and in cross-section in Fig. 3. It comprises an elongated strip having a plurality of lanced struck-up arms 18 extending above one surface, in alignment with openings 19. These struck-up arms divide the strip into a plurality of planar segments 20 of substantially equal size, each planar segment and adjacent arms defining a pocket to receive a tongue 21 of the clip 12. The particular clip shown comprises a channel-shaped body portion having spaced, substantially parallel arms 22 extending forwardly from a web to which the tongue 21 is fastened. The arms 22 form a support for the display top partition panel 13.

In a specific physical embodiment, the clip support 11 has been made of half-hard cold rolled steel, 0.050" by ¾" stock. The struck-up arms 18 are ½" in length, are raised 0.072" above the surface of the strip, and are spaced so that the planar segments 20 are ¼" in width. This spacing provides 199 pockets to receive a clip 12 on a strip 59½" long.

A modification of the clip support 11 is shown in Figs. 4 and 5, and is designated 11'. In this modification, arms 18' are dimpled, or depressed intermediate their ends to form a return portion 23, which registers in the aligned opening, and imparts greater rigidity to the arms 18'.

In another embodiment of the invention, a clip support designated by the numeral 24 (Fig. 6), is shown in a particular display unit in which counter uprights, or standards 25, are provided for display purposes. The clip support 24 is an elongate metal angle having a vertical flange 26 (see Fig. 7) divided into a plurality of pockets to receive the tongues of clips 12 in substantially the same manner as heretofore described in connection with clip supports 11 and 11'. A horizontal or bottom flange 27 of the angle has a plurality of vertical offset or joggled portions 28.

The particular display unit shown in Figs. 6 and 7 comprises adjacent counters 29, each having upwardly extending sides which form counter top flanges 30. A clip support 24 is shown installed along the adjacent flanges of each counter, with opposed clip supports 31 parallel thereto on each counter, and a partition panel 32 supported on a counter top by clips 12, detachably mounted on the clip supports 24 and 31. The standards 25 comprise metal uprights welded to hat-section base portions 33, which are located by the joggled portions 28 of the clip supports 24. Each base portion 33 passes over abutting flanges 30 of the adjacent counters, and under a joggled portion 28 of the clip support, so that a standard and a clip support may be secured to the counter top by sheet metal screws 35, or the like, located by indentations or slots 36 in the clip support 24. The vertical offset or joggled portion 28 is sheared away from the vertical flange of clip support 24, as at 37, for ease of forming, and the vertical flange is cut away to the height of the vertical offset or joggles, to receive base portions 38 of the standards 25.

Figure 8:
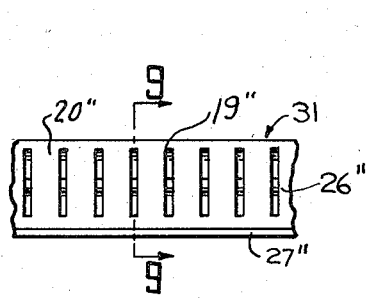
Fig. 8 is a view in elevation of a further modified form of clip support according to the invention.
Figure 9:
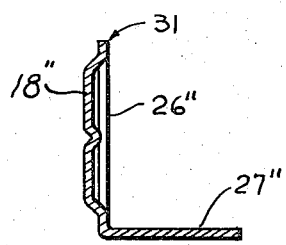
Fig. 9 is a view in section along the line 9—9 of Fig. 8.

The clip supports 31 are shown in more detail in Figs. 8 and 9, and are identical with the supports 24, except that they do not have the joggled portions 28. The supports 31 have vertical flanges 26", horizontal flanges 27", struck-up arms 18" in alignment with openings 19", and planar segments 20".

The advantages of the instant invention will be apparent from the foregoing description of two particular display units. The partition clip supports described herein permit great flexibility in the arrangement of displays. The invention is embodied in various lengths of like members, which lengths can be made to fit individual counters, shelves, table tops or the like, as desired. In any given display unit, the large number of attaching points per unit of length of the clip supports gives maximum flexibility in the arrangement and re-arrangement of partitions to form bins or compartments for the display of merchandise.

It will be apparent that various changes and modifications can be made from the specific details shown in the attached drawings and discussed in connection therewith without departing from the spirit of the attached claims.

What I claim is:

1. In a display unit including a merchandise-support structure, a support member that is an elongate metal strip affixed along at least one side of the structure, clips having mounting tongues and spaced substantially parallel arms, and being detachably mounted on the strip by frictional engagement between the tongues and the strip, and partition members supported between the arms, the improvement which comprises, as the support member, a flat elongate metal strip, and a plurality of longitudinally extending spaced parallel arm members integral with said strip at their longitudinal extremities, said arm members extending transversely across the width, and above a surface of said strip with exposed opposed surfaces lying generally between planes at right angles to the strip surface and generally parallel thereto, and dividing the length thereof into a plurality of essentially coplanar segments of substantially equal size, the mounting tongue of each of the clips being frictionally engaged with one of the segments of said strip, and rotation of each of the clips relative to said strip being prevented by two of said arm members which are adjacent thereto.

2. In a display unit including a merchandise-support structure, a support member that is an elongate metal strip affixed along at least one side of the structure, clips having mounting tongues and spaced substantially parallel arms, and being detachably mounted on the strip by frictional engagement between the tongues and the strip, and partition members supported between the arms, the improvement which comprises, as the support member, a flat elongate metal strip having a plurality of longitudinally extending spaced parallel openings extending transversely across a major portion of the width thereof and dividing the length thereof into a plurality of essentially coplanar segments of substantially equal size, and longitudinally extending arm members structurally integral with said strip at their longitudinal extremities, each of said arm members being aligned with one of the openings, and having exposed opposed surfaces lying generally between planes at right angles to the strip surface and generally parallel thereto, the mounting tongue of each of the clips being frictionally engaged with one of the segments of said strip, and rotation of each of the clips relative to said strip being prevented by two of said arm members which are adjacent thereto.

3. In a display unit including a merchandise-support structure, a support member that is an elongate metal strip affixed along at least one side of the structure, clips having mounting tongues and spaced substantially parallel arms, and being detachably mounted on the strip by frictional engagement between the tongues and the strip, and partition members supported between the arms, the improvement which comprises, as the support member, a flat, elongate metal strip having a plurality of longitudinally extending spaced parallel openings extending transversely across a major portion of the width thereof, and dividing the length thereof into a plurality of essentially coplanar segments of substantially equal size, and longitudinally extending arm members structurally integral with said strip at their longitudinal extremities, each of said arm members being aligned with one of the openings, and extending above the plane of the strip segments, and each having at least one return portion intermediate its ends registering in the aligned opening, the mounting tongue of each of the clips being frictionally engaged with one of the segments of said strip, and rotation of each of the clips relative to said strip being prevented by two of said arm members which are adjacent thereto.

References Cited in the file of this patent

UNITED STATES PATENTS

| | | |
|---|---|---|
| 1,508,259 | Stafford | Sept. 9, 1924 |
| 1,911,377 | Mapson | May 30, 1933 |
| 1,932,217 | Kaufman | Oct. 24, 1933 |
| 2,123,264 | Walter | July 12, 1938 |
| 2,141,009 | Meyer | Dec. 20, 1938 |
| 2,148,892 | Bales | Feb. 28, 1939 |
| 2,529,826 | Walker | Nov. 14, 1950 |
| 2,586,925 | Drengberg | Feb. 26, 1952 |